Feb. 15, 1955     M. S. MERRILL     2,702,195
SWINGABLE STEP FOR VEHICLES

Filed March 27, 1953     2 Sheets-Sheet 1

INVENTOR.
Marcellus S. Merrill
BY
ATTORNEY

Feb. 15, 1955  M. S. MERRILL  2,702,195
SWINGABLE STEP FOR VEHICLES
Filed March 27, 1953  2 Sheets-Sheet 2

INVENTOR.
Marcellus S. Merrill
BY
ATTORNEY

United States Patent Office 2,702,195
Patented Feb. 15, 1955

2,702,195

SWINGABLE STEP FOR VEHICLES

Marcellus Samuel Merrill, Denver, Colo.

Application March 27, 1953, Serial No. 344,992

7 Claims. (Cl. 280—167)

This invention relates to steps for vehicles and more particularly to a step which is capable of swinging upward toward the vehicle when an obstruction is encountered and thereby assume a position where it can pass over the obstruction without damage.

One of the objects of the invention is to produce an improved swingably mounted step for a vehicle, and particularly such a vehicle known as a "jeep" which has its present step rigidly attached to the chassis and extending downward between the front and rear wheels.

Another object of my invention is to produce a swingable vehicle step that is so hinged to the chassis of the vehicle that it will normally be yieldably held in a down position, ready for use, and when in such position will be so held as to be relatively stable and not swing therefrom, except when fairly strong force is exerted thereon.

A further object is to produce a swingable vehicle step which can be quickly and easily swung upward to an "out of use" position closely adjacent to the vehicle chassis and positively maintained in such position.

Yet another object is to produce an improved and simplified swingable mounting for a vehicle step which can be manufactured at a low cost, will be easily installed to produce a strong step and which will be capable of assuming a "held" position when it is "down" ready for use, or "up" close to the vehicle body.

Still a further object is to produce a new hinge mounting for a swingable step that will embody a cam structure functioning under spring pressure and capable of action to yieldably hold the step in a stable "down" position for ready use or hold the step in an "up" position near its attachment with the vehicle body without use of hooks or like devices.

Other objects of the invention will become apparent from the following description taken in connection with the accompanying drawings in which.

Figure 1:
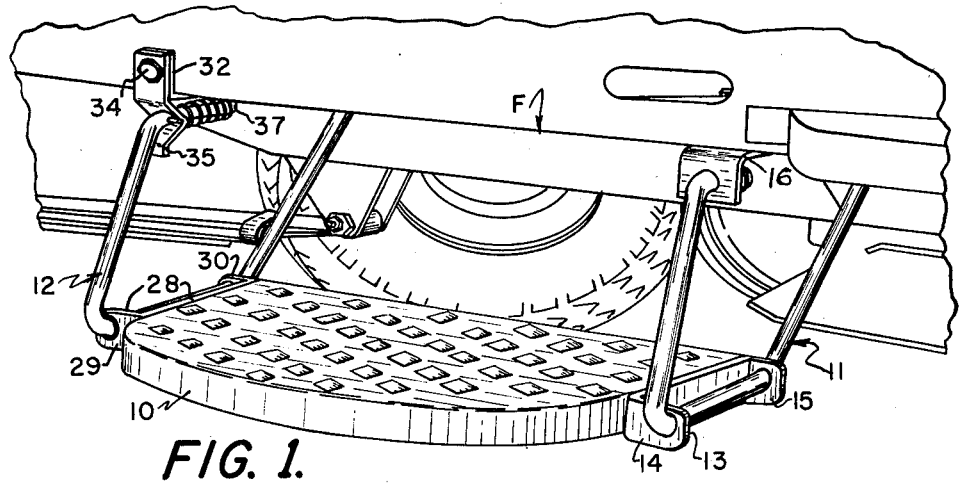
Figure 1 is a perspective view of a swingable step embodying my invention, showing the step mounted on the vehicle and in "down" position ready for use.

Referring to the drawings in detail, my improved swingable step, as shown by way of example, comprises a step member or plate 10 made from sheet metal in the shape of a D with down turned flanges for strengthening purposes. This step plate is swingably connected to the vehicle frame F by a front hanger 11 and a rear hanger 12. Both of these hangers are U-shaped and of substantially the same construction, being made by suitably bending rods.

To the front flange of the step plate there is attached, as by welding, a bracket 13 having at its ends turned out ears 14 and 15 which, when the bracket is attached to the step plate, will project away from the front end thereof in the same general plane as the step plate. Each ear has a hole therethrough and received in the holes is the connecting section between the legs of the U-shaped front hanger 11, thus producing a hinge connection between the step plate and the hanger.

Figure 2:
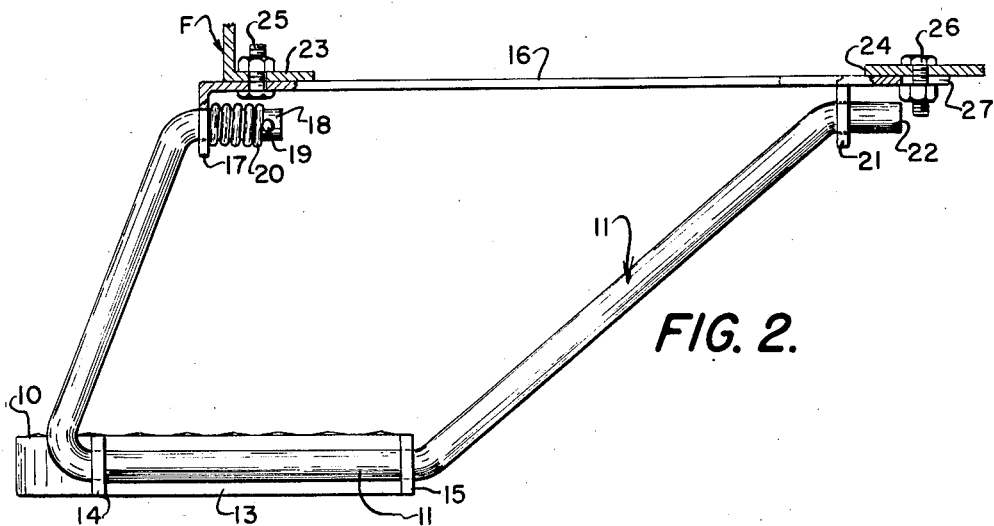
Figure 2 is a front view of the step showing the front hanger mounting.

As best shown in Figure 2, the front hanger is arranged to be hinged to the frame of the vehicle and this is accomplished by a bracket bar 16. This bar has at its outer end a turned down ear 17 provided with a hole therein for receiving the turned in end 18 on the outer leg of the hanger. This end 18 carries a pin 19 and between this pin and the ear 17 of the bracket is a coiled spring 20 which will hold the hanger in the bracket and also prevent rattling. The bracket bar 16 at its inner end has a struck out ear 21 which is turned downwardly and this ear has a hole which receives the turned in end 22 of the inner leg of the hanger 11. The bracket bar 16 is attached to available frame parts 23 and 24, as by bolts 25 and 26. Bolt 25 is at the outer end of the bracket and bolt 26 is at the inner end, which is a portion extending beyond the struck out ear 21 and being provided with an open ended slot 27 for ease in mounting by bolt 26. It will be noted the hanger 11 has its legs extending inwardly at an angle to the step plate in order to have the step plate extend outwardly from the side of the vehicle frame, this permitting the foot to be easily placed on the step plate. The rear hanger 12 will also have the same angular arrangement of its legs.

The rear hanger is hinged to the rear of the step plate in the same manner as the front hanger, all as shown in Figure 1. To the rear flange of the step plate is attached a bracket 28 having ears 29 and 30 provided with holes and receiving the connecting section between the legs of the U-shaped rear hanger 12.

Figure 3:
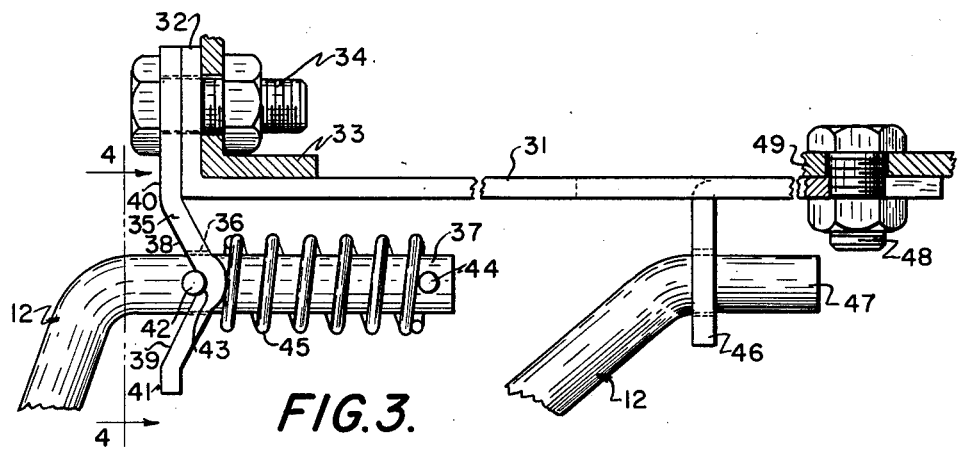
Figure 3 is a view of the rear hanger mounting and cam structure associated therewith, as seen from the direction of the front hanger.

The hinging of the legs of the rear hanger to the vehicle frame F is accomplished as shown in Figure 3. There is provided an attaching bracket bar 31, the outer end of which has a turned up ear 32 which will fit against the outer side of the side frame member 33. This ear has an attaching hole and receives the bolt 34 to secure the outer end of the bar to the frame member.

This bolt also attaches a specially shaped plate 35 to the frame member lying alongside the ear 32 and projecting downwardly from the bracket bar 31. If desired, the ear and plate can be secured together as by welding.

Figure 4:
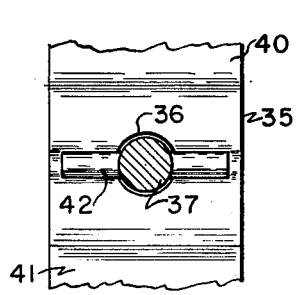
Figure 4 is a sectional view taken on the line 4—4 of Figure 3.
Figure 6:
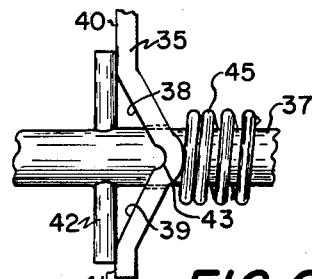
Figure 6 is a side view of the cam structure showing its condition when the step is held "up."

As shown in Figures 3, 4 and 6, the plate 35 has a hole 36 therein for receiving the turned in end 37 of the outer leg of the rear hanger 12. The plate 35 has a V-shape, as viewed from the side (Figures 3 and 6) and the apex of the V is at the hole 36. There is thus provided on the outer face of the plate two cam surfaces 38 and 39 and at the ends of these cam surfaces are flat surfaces 40 and 41 on the outer face of the plate. The cam surfaces and the flat surfaces are arranged to have cooperating therewith a cross pin 42 carried by the turned in end 37 of the outer leg of the hanger. The pin is closely adjacent the junction of the end 37 with the main part of the hanger leg. This pin is horizontal when the step is to be in "down" or usable position as shown in Figure 1. At the junction of the cam surfaces 38 and 39 the plate has a horizontal groove or trough 43, semi-cylindrical in cross section with a radius of curvature the same as the cross pin 42 so the pin will lie in the groove when the step is down, all as shown in Figures 1 and 3.

The inner end of the turned in end 37 of the outer hanger leg has a pin 44 and interposed between this pin and the back of the plate 35 is a strong coiled spring 45 which will at all times act with considerable force to hold the cross pin 42 in forceful contact with the outer face of the plate 35, including the groove 43, the cam surfaces 38 and 39 and the flat surfaces 40 and 41, depending on the turned position of the rear hanger. If the hanger is "down", then the pin 42 is yieldably held in the groove which acts as a cam "dwell". If the hanger is turned toward a horizontal position the pin will ride out of the groove 43 with an attendant compressing of the spring and then the pins' ends will move up the two cam surfaces with a continued compressing of the spring 45 until the ends of the pins ride onto the flat surfaces 40 and 41 where the spring action will hold the pin and hanger, all as illustrated in Figure 6. If the ends of the pin 42 are moved off the flat surface back onto the converging cam surface, the strong action of the spring will pull the ends of the pin down the sloping surfaces and into the groove, thus returning the hanger to "down" position. This will all be automatic and once the pin is back in the groove, it will be yieldably "locked" therein due to the groove acting as a dwell for the pin. The hanger will then be relatively stable, that is, not easily swung from its "down" position. Greater forces are necessary to move the pin out of the groove than are necessary to swing the step thereafter.

The inner end of the bracket bar 31 has a struck out ear 46 which extends downwardly and is provided with a hole to receive the turned in end 47 of the inner leg of the rear hanger, thus completing the hinge mounting. The inner end of the bracket bar has an end extending beyond the ear 46 and this end has an open ended slot to receive an attaching bolt 48 to attach the inner end of the bracket bar to a suitable port 49 of the vehicle frame, all as illustrated in Figure 3.

From the foregoing description of the structure of my swingably mounted vehicle step, it will be obvious that the step will not be broken off or damaged if the vehicle should be driven over such uneven surfaces that the step will be hit by an upstanding object such as a rock or log. If the step should be "down" and encounter an object when the vehicle is moving the impact will swing the step plate and hangers to a position closer to the vehicle frame and thus raise it so that the step will move over the object. When the step is swung from its "down" position shown in Figure 1, the pivoting of the rear hanger 12 in its mounting bracket bar will result in the cross pin 42 being moved out of the horizontal groove 43 and the ends of the pin caused to move up the cam surfaces with an attendant compression of spring 45. As soon as the step passes over the object, the force of spring 45 will cause the step to return to "down" position as the cross pin is pulled back into groove 43.

Figure 5:
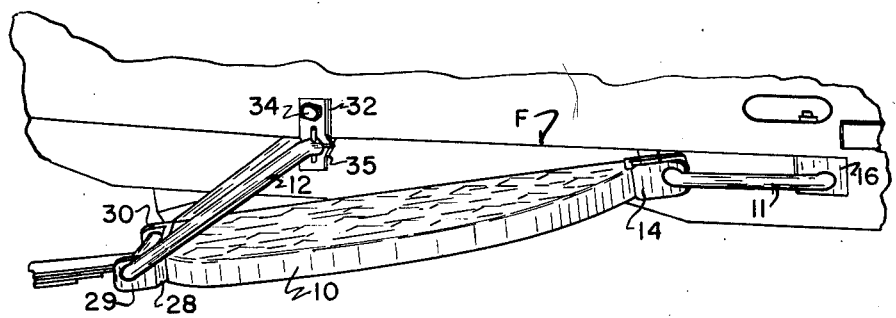
Figure 5 is a view showing the step in its "up" position where it will be held by spring action through the cam structure.

If it should be desired to hold the step in its "up" position closely adjacent the vehicle frame, it can be done by swinging the step to the position shown in Figure 5. In this position the cross pin 42 will be so turned by the rear hanger that its ends will ride onto the flat surfaces 40 and 41 where they will be held by the action of spring 45. Under these conditions another action takes place which will "lock" the step in its "up" position. This is well illustrated in Figure 5 and is accomplished by the particular mounting of the step plate, the hangers and their relation to each other as to size, position, etc. As illustrated in Figure 1, the hangers are hinged to the vehicle at points which are slightly farther apart than the hinging of the hangers to the step plate. Thus, when the step plate is caused to be swung upward to the vehicle frame, as for example in a rearward direction, the front end of the step plate can move all the way up to engage the vehicle frame, but the rear end of the step plate is prevented from this, due to the position of particular hinge point with the frame. Consequently, the step plate will have a slight angular relation with the vehicle frame, sloping upwardly from the rear end to the front end. When this position of the step plate is reached, the legs of the front hanger will be substantially horizontal. Thus, the hinge point between the front hanger and the step plate has moved "over center", that is, moved across the line where the step plate and hanger are in the same plane. As soon as the "over center" condition occurs, there will be a force developed under the action of the spring 45 tending to push the ends of cross pin 45 down the cam surface, which will act toward the hinge connection at the front of the step plate and thus apply an upward force on this hinge connection holding the plate yieldably "locked" in an up position. To bring the step down, a relative strong force is required. This force must be sufficient to again bring the hinge connection at the step plate and front hanger back from "over center" condition.

From the foregoing description of a particular example of a swingable vehicle step embodying my invention, it is believed to be obvious that modifications in structure can be made without departing from the fundamental principles embodied therein. Therefore, I desire it to be understood that the scope of my invention is not to be limited except in accordance with the terms of the appended claims and equivalents thereof.

What is claimed is:

1. In a swingable step for a vehicle, a step member, two U-shaped hanger rods for the step member, means for hinging the connecting part of the legs of each hanger to an end of the step member, and means for hinging the free ends of the legs of the hangers to the vehicle.

2. In a swingable step for a vehicle, a step member, two U-shaped hanger rods, each having a straight connecting portion between its legs and its legs extending in angular relation from the straight section, said angular relation being less than 90 degrees and the legs extending in the same general direction, means for hinging said connecting portion of each hanger to an end of the step member, and means for hinging the ends of the legs of each hanger to the vehicle frame.

3. In a swingable step for a vehicle, a step member, two U-shaped hanger rods for the step member, means for hinging the connecting part of the legs of each hanger to an end of the step member, and means for hinging the free ends of the legs of the hangers to the vehicle, said last named means comprising brackets secured to the vehicle frame together with associated downwardly extending members in spaced relation and being provided with holes and said hanger legs having laterally extending portions positioned in the holes of said downwardly extending members, and means for holding the hangers so as to prevent disengagement with the brackets.

4. In a swingable step for a vehicle, a step member, hangers for the step, means for hinging the step to the hangers, means for hinging the hangers to the vehicle and including a plate member having a hole in which a portion of a hanger is positioned for rotation, said plate having plane surfaces diverging from the axis of the hole, a semi-cylindrical groove at the inner junction end of the surfaces, a cross pin carried by the portion of the hanger extending through the plate hole and of a side to fit into the groove, and a spring acting at all times to force the pin toward the plate surface and normally move the pin into the groove if the hanger is turned so the ends of the pin move up the diverging surface, said pin and the groove being so arranged that the step is down when the pin lies in the groove.

5. In a swingable step for a vehicle, a step member, spaced hangers for the step member, means for hinging each hanger to the step member, means for hinging each hanger to the vehicle frame, the spacing of the hinging of the hangers to the vehicle frame being such in relation to the hinging thereof to the step that when the step is swung upwardly to be as close as possible to the frame the hinge connection between a hanger and the step will be moved "over center," and yieldable means for holding the step in the "over center" position.

6. In a swingable step for a vehicle, a step member, spaced hangers for the step member, means for hinging each hanger to the step member, means for hinging each hanger to the vehicle frame at points having greater spacing than the hinging points to the step member so that the step member when swung upwardly as far as possible toward the vehicle a hinge point between a hanger and the step will move "over center," a spring acting to hold the step and hanger in the "over center" position, and means acted on by the spring for returning the step to the "down" position when the hinge point is returned from "over center" and for yieldably "locking" the step in said down position whereby a greater force is required to move the step from the "locked" down position than that required to swing the step upwardly toward the vehicle frame.

7. In a swingable step for a vehicle, a step member, hanger means for the step member at each end thereof, each hanger means including at least two leg portions and at least one connecting portion, means for hinging the connecting portion of each hanger means to an end of the step member, means for hinging the ends of each leg portion to the vehicle, said hinging means permitting raising and lowering of the step member with respect to the vehicle, each leg portion extending from its connecting portion at an acute angle relation with the leg portions extending in the same general direction.

References Cited in the file of this patent

UNITED STATES PATENTS

| | | |
|---|---|---|
| 398,496 | Cork | Feb. 26, 1889 |
| 750,893 | Riggs | Feb. 2, 1904 |
| 854,753 | May | May 28, 1907 |
| 2,575,615 | Crump | Nov. 20, 1951 |